(12) United States Patent
Bharatiya et al.

(10) Patent No.: US 11,241,004 B2
(45) Date of Patent: *Feb. 8, 2022

(54) PLUGGED SPRAY NOZZLE DETECTION USING RADIO-FREQUENCY TRANSMISSIONS

(71) Applicant: Deere & Company, Moline, IL (US)

(72) Inventors: Paresh Bharatiya, Pune (IN); Raja Sivaji, Pune (IN)

(73) Assignee: Deere & Company, Moline, IL (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/988,186

(22) Filed: May 24, 2018

(65) Prior Publication Data

US 2019/0357518 A1 Nov. 28, 2019

(51) Int. Cl.
| | | |
|---|---|---|
| *A01M 7/00* | (2006.01) | |
| *G05D 1/02* | (2020.01) | |
| *A01C 23/02* | (2006.01) | |

(52) U.S. Cl.
CPC .......... *A01M 7/006* (2013.01); *A01M 7/0042* (2013.01); *G05D 1/028* (2013.01); *A01C 23/027* (2013.01); *A01M 7/0089* (2013.01)

(58) Field of Classification Search
CPC .. A01M 7/0042; A01M 7/0096; A01M 7/006; A01M 7/0089; G05D 1/028; A01C 23/027; A01B 71/08
See application file for complete search history.

(56) References Cited

U.S. PATENT DOCUMENTS

| | | |
|---|---|---|
| RE31,023 E | 9/1982 | Hall |
| 4,767,062 A | 8/1988 | Fletcher |
| 4,905,837 A | 3/1990 | Rogers et al. |
| 5,927,603 A | 7/1999 | McNabb |
| 7,311,004 B2 | 12/2007 | Giles |
| 8,191,798 B2 | 6/2012 | Hahn et al. |
| 8,833,680 B2 | 9/2014 | Ellingson et al. |
| 8,942,893 B2 | 1/2015 | Rosa et al. |

(Continued)

FOREIGN PATENT DOCUMENTS

| | | |
|---|---|---|
| AU | 2011203120 A1 | 1/2012 |
| CN | 106719551 A | 5/2017 |

(Continued)

OTHER PUBLICATIONS

EP3248463A1 Translated. (Year: 2017).*

(Continued)

*Primary Examiner* — Steven M Cernoch

(74) *Attorney, Agent, or Firm* — Christopher R. Christenson; Kelly, Holt & Christenson PLLC

(57) ABSTRACT

An agricultural sprayer includes at least one nozzle configure to receive a fluid and direct atomized fluid to an agricultural surface in a dispersal area. A radio-frequency (RF) transmitter is disposed to generate an RF signal that passes through the dispersal area. The RF signal is detectably changed when interacting with droplets of the atomized fluid. A first RF receiver is disposed to receive the RF signal after the RF signal passes through the dispersal area and provides an output indicative of the RF signal. A controller is coupled to the first RF receiver and is configured to detect plugging of the at least one nozzle based on the output of the first RF receiver.

20 Claims, 11 Drawing Sheets

(56) References Cited

U.S. PATENT DOCUMENTS

Figure 1:
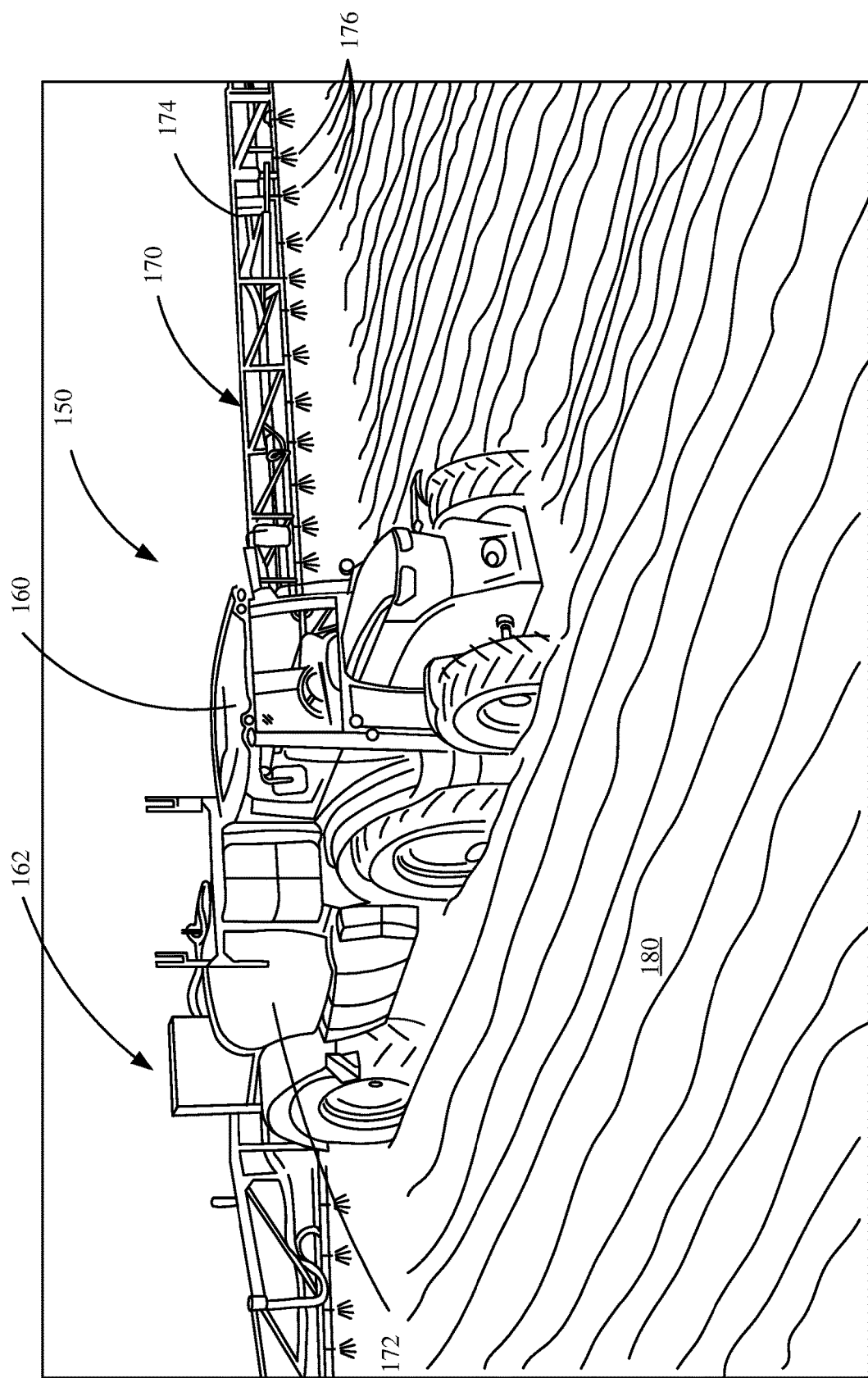
Figure 2A:
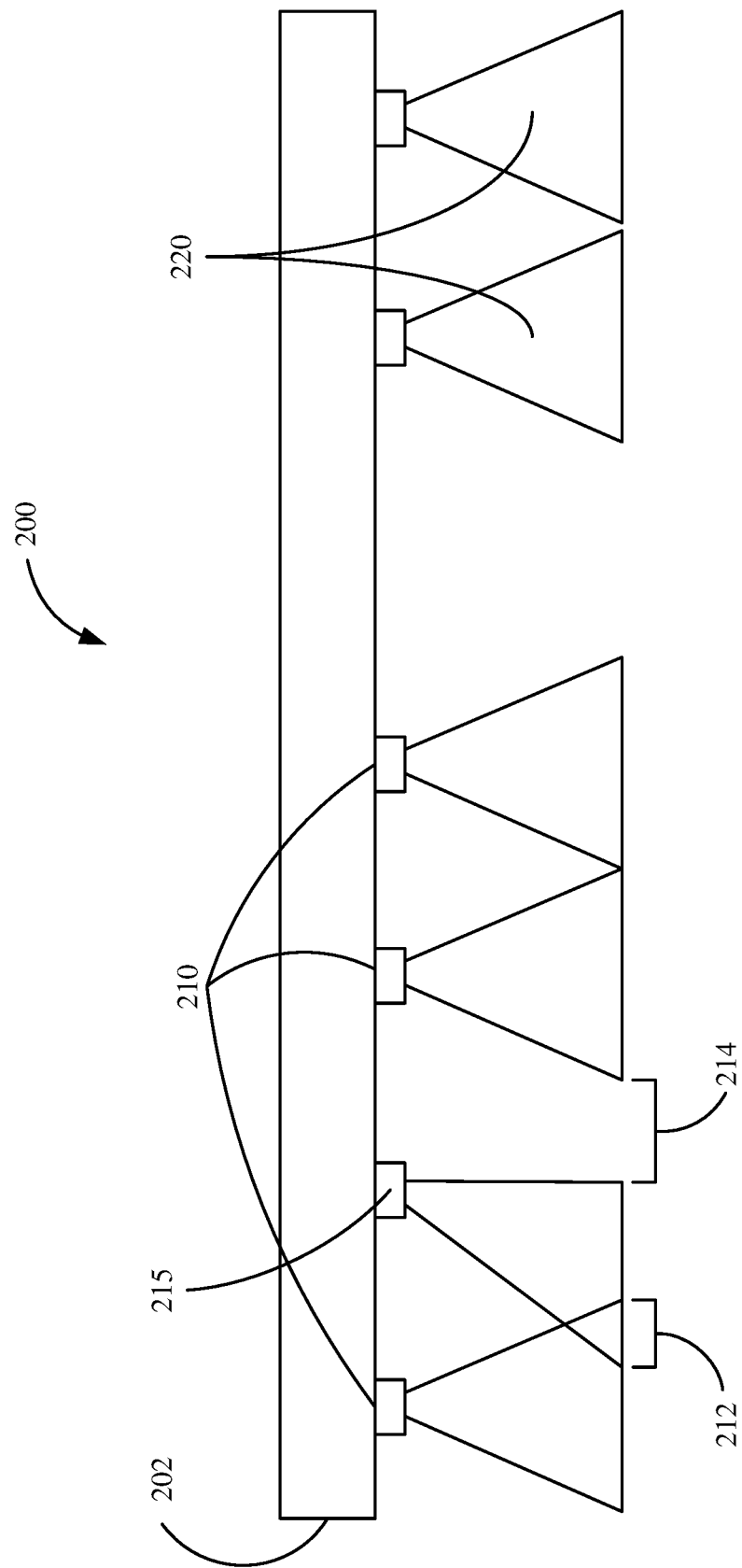
Figure 2B:
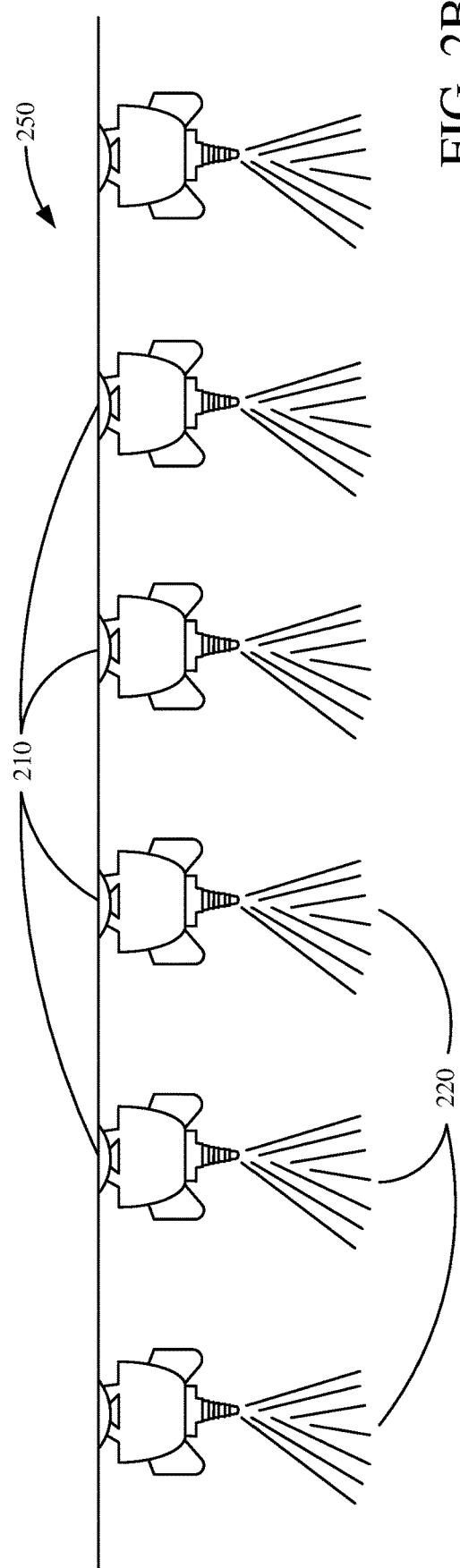
Figure 2C:
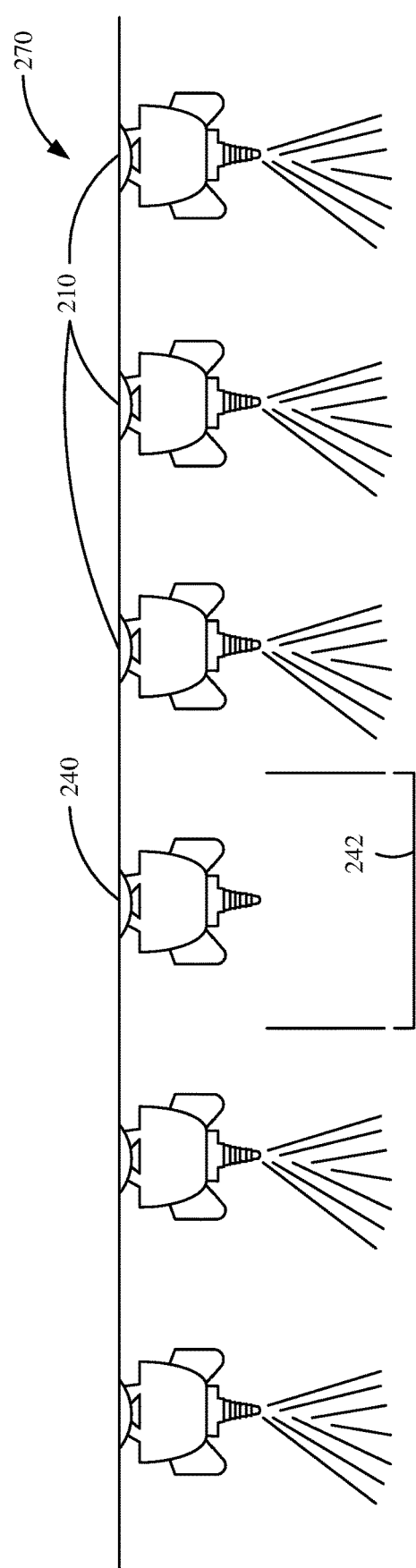

| | | | |
|---|---|---|---|
| 9,532,563 | B2 | 1/2017 | Arenson et al. |
| 9,740,208 | B2 | 8/2017 | Sugumaran et al. |
| 9,824,438 | B2 | 11/2017 | Reichhardt |
| 10,391,510 | B2 | 8/2019 | Posselius et al. |
| 2006/0265106 | A1 | 11/2006 | Giles et al. |
| 2010/0264163 | A1 | 10/2010 | Tevs et al. |
| 2012/0000991 | A1 | 1/2012 | Hloben |
| 2012/0168530 | A1 | 7/2012 | Ellingson et al. |
| 2013/0211628 | A1 | 8/2013 | Thurow et al. |
| 2014/0049395 | A1 | 2/2014 | Hui et al. |
| 2014/0263713 | A1* | 9/2014 | Stocklin ............... A01C 17/008 239/11 |
| 2015/0367358 | A1 | 12/2015 | Funseth et al. |
| 2015/0375247 | A1* | 12/2015 | Funseth ............... B05B 1/1645 239/68 |
| 2018/0036755 | A1* | 2/2018 | Illemann ............... B05B 12/085 |
| 2018/0129879 | A1 | 5/2018 | Achtelik et al. |
| 2019/0357518 | A1 | 11/2019 | Bharatiya et al. |
| 2019/0358660 | A1 | 11/2019 | Paralikar et al. |
| 2019/0358661 | A1* | 11/2019 | Bharatiya ............. G01S 13/003 |

FOREIGN PATENT DOCUMENTS

| | | |
|---|---|---|
| CN | 107284672 A | 10/2017 |
| DE | 102015111889 A1 | 1/2017 |
| EP | 1359406 A1 | 11/2003 |
| EP | 2893795 A1 | 7/2015 |
| EP | 3248463 A1 | 11/2017 |
| EP | 3366129 A1 | 8/2018 |
| FR | 2843279 A1 | 11/2003 |
| JP | H0599802 A | 4/1993 |
| WO | WO2012012318 A2 | 1/2012 |
| WO | WO2014067785 A1 | 5/2014 |

OTHER PUBLICATIONS

European Search Report issued in counterpart European Patent Application No. 19175418.3 dated Nov. 4, 2019 (10 pages).

European Search Report issued in counterpart European Patent Application No. 19175919.0 dated Nov. 4, 2019 (11 pages).

European Search Report issued in counterpart European Patent Application No. 19175418.3 dated Nov. 4, 2019 (11 pages).

Jiao Leizi et al, Monitoring spray drift in aerial spray application based on infrared thermal imaging technology, Computers and Electronics in Agriculture, Elsevier, Amsterdam, NL, vol. 121, Dec. 30, 2015 (Dec. 30, 2015), pp. 135-140.

European Search Report issued in counterpart application No. 19175914.1 dated Apr. 15, 2020 (05 pages).

U.S. Appl. No. 16/210,209 Office Action dated May 19, 2020, 23 Pages.

Restriction Requirement for U.S. Appl. No. 16/401,628, dated Sep. 21, 2020, 8 pages.

Office Action for U.S. Appl. No. 16/401,628, dated Feb. 1, 2021, 23 pages.

Application and Drawings for U.S. Appl. No. 16/401,628, filed May 2, 2019, 48 pages.

U.S. Appl. No. 15/988,186 Final Office Action dated Oct. 27, 2020, 13 pages.

Prosecution History for U.S. Appl. No. 16/210,209 including: Non-Final Office Action dated May 6, 2021, Advisory Action dated Jan. 14, 2021, and Final Office Action dated Oct. 27, 2020, 32 pages.

U.S. Appl. No. 16/401,628 Office Action dated May 17, 2021, 11 pages.

U.S. Appl. No. 16/210,209 Office Action dated May 6, 2021, 17 pages.

Office Action for U.S. Appl. No. 16/210,209 dated November 9, 2021, 24 pages.

\* cited by examiner

PLUGGED SPRAY NOZZLE DETECTION USING RADIO-FREQUENCY TRANSMISSIONS

FIELD OF THE DESCRIPTION

This invention relates to a spraying apparatus for an agricultural sprayer. More specifically, the invention relates to systems and methods for detecting full or partial plugging of a spray nozzle of an agricultural sprayer.

BACKGROUND

Agricultural spraying systems are known. Such systems typically include a fluid line or conduit mounted on a foldable, hinged, or retractable and extendible boom. The fluid line is coupled to one or more spray nozzles mounted along the boom. Each spray nozzle is configured to receive the fluid and direct atomized fluid to a crop or field during application.

Spraying operations are generally intended to distribute a product (e.g. fertilizer, pesticides, etc.) evenly over an agricultural surface, such as a field or crop. Properly functioning spray nozzles ensure that dispersal of the product occurs evenly and is important to ensure crop yields.

SUMMARY

An agricultural sprayer includes at least one nozzle configure to receive a fluid and direct atomized fluid to an agricultural surface in a dispersal area. A radio-frequency (RF) transmitter is disposed to generate an RF signal that passes through the dispersal area. The RF signal is detectably changed when interacting with droplets of the atomized fluid. A first RF receiver is disposed to receive the RF signal after the RF signal passes through the dispersal area and provides an output indicative of the RF signal. A controller is coupled to the first RF receiver and is configured to detect plugging of the at least one nozzle based on the output of the first RF receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1 illustrates an agricultural field sprayer with which embodiments described herein are particularly useful.

FIGS. 2A-2C illustrate example spray patterns from spray nozzles within a spray system.

FIGS. 3A and 3B illustrate systems for detecting spray nozzle plugging in accordance with an embodiment of the present invention.

FIGS. 4A and 4B illustrate a multi-nozzle system employing RF-based plugging detection in accordance with an embodiment of the present invention.

FIGS. 5A and 5B illustrate a multi-nozzle system employing RF-based plugging detection in accordance with another embodiment of the present invention.

FIG. 6 is a flow diagram of a method of detecting a plugged nozzle using RF transmissions in accordance with an embodiment of the present invention.

FIG. 7 illustrates an environment in which embodiments described herein are particularly useful.

DETAILED DESCRIPTION

Embodiments described herein generally employ radio-frequency (RF) transmissions to detect a change in output from one or more nozzles. As the radio-frequency energy of the transmission passes through the droplets of a spray nozzle, the RF signal is changed in a detectable way. An RF receiver, configured to detect the RF signal that has passed through the spray, provides an output that is monitored to provide spray nozzle diagnostic indications. As used herein, radio-frequency (RF) is defined to mean electromagnetic energy having a frequency in the range from about 3 kHz to 300 GHz.

FIG. 1 illustrates an agricultural field sprayer with which embodiments described herein are particularly useful. FIG. 1 illustrates an agricultural environment 150 in which a tractor 160 is coupled to, and pulls, a towed sprayer 162. Towed sprayer 162 includes spray system 170, which has a tank 172 containing a liquid that is being applied to field 180. Tank 172 is coupled to boom 174, and the product is delivered to spray nozzles 176, which are spaced apart along boom 174. It is important, in environment 150, that product is evenly distributed across field 180. For example, if fertilizer is unevenly applied, it is wasted in areas of over-application, and areas of under-application can see reduced yields.

FIGS. 2A-2C illustrate example spray patterns from spray nozzles within a spray system. FIG. 2A is a diagrammatic representation of an example spray system 200 having a number of spray nozzles 210 spaced apart along boom 202. Each spray nozzle 210 generates a dispersal 220 of sprayed or otherwise atomized product. As illustrated in FIG. 2A, spray nozzle 215 is at least partially plugged, creating an overlap area 212, where distributed product is overapplied, and an uncovered area 214, where no product is applied.

FIGS. 2B and 2C illustrate a contrast between a properly functioning spray system 250 and a spray system 270 that has a plugged spray nozzle 240. As illustrated in FIG. 2C, because spray nozzle 240 is fully plugged, area 242 will receive no dispersed product. This can result in lower yield for the portion of the field covered by area 242. Additionally, a plugged spray nozzle also impacts the spray quality as the target application rate is not achieved for a portion of the field.

FIGS. 3A and 3B illustrate systems for detecting spray nozzle plugging in accordance with an embodiment of the present invention. FIG. 3A is a diagrammatic view of RF-based plugged nozzle detection in accordance with one embodiment. Nozzle 310, when functioning properly, emits product in a predictable dispersal pattern 320. An RF transmission 315, sent from signal transmitter 312, passes through dispersal pattern 320, and is detected by RF signal detector 314. The RF signal 315 is detectably changed as it passes through dispersal pattern 320. This detectable change is generally a change in the attenuation of the signal. Thus, controller 317 coupled to transmitter 312 and receiver 314, can detect a change in the received signal by monitoring one or more characteristics of the RF signal (such as amplitude) using receiver 314. In this way, controller 317 detects changes indicative of plugging and provides a useful ability to diagnose, and/or correct, a plugged nozzle quickly. Controller 317 can be any suitable logic or circuit arrangements that are able to receive an output signal from receiver 314 and analyze the output to detect partial or full nozzle plugging. In one embodiment, controller 317 is a microprocessor. Controller 317 may be separate from each of transmitter 312 and receiver 314 or it may be combined with either of transmitter 312 or receiver 314. Advantageously, the techniques described herein employ RF energy to detect spray nozzle plugging and this do not employ optical techniques, which can be distorted or otherwise affected by dirt, dust, darkness or other variables.

One example of electromagnetic energy being affected by passing through droplets of liquid is known as rain fade. Rain fade describes the attenuation of the RF signal as it passes through and is at least partially absorbed by atmospheric snow, ice or rain. Rain fade is particularly evident at RF frequencies above 11 GHz and is typically a quantity that is compensated for in electromagnetic transmissions. One particularly useful range of RF signals for embodiments described herein is a frequency range from about 7 GHz to about 55 GHz.

Figure 3A:
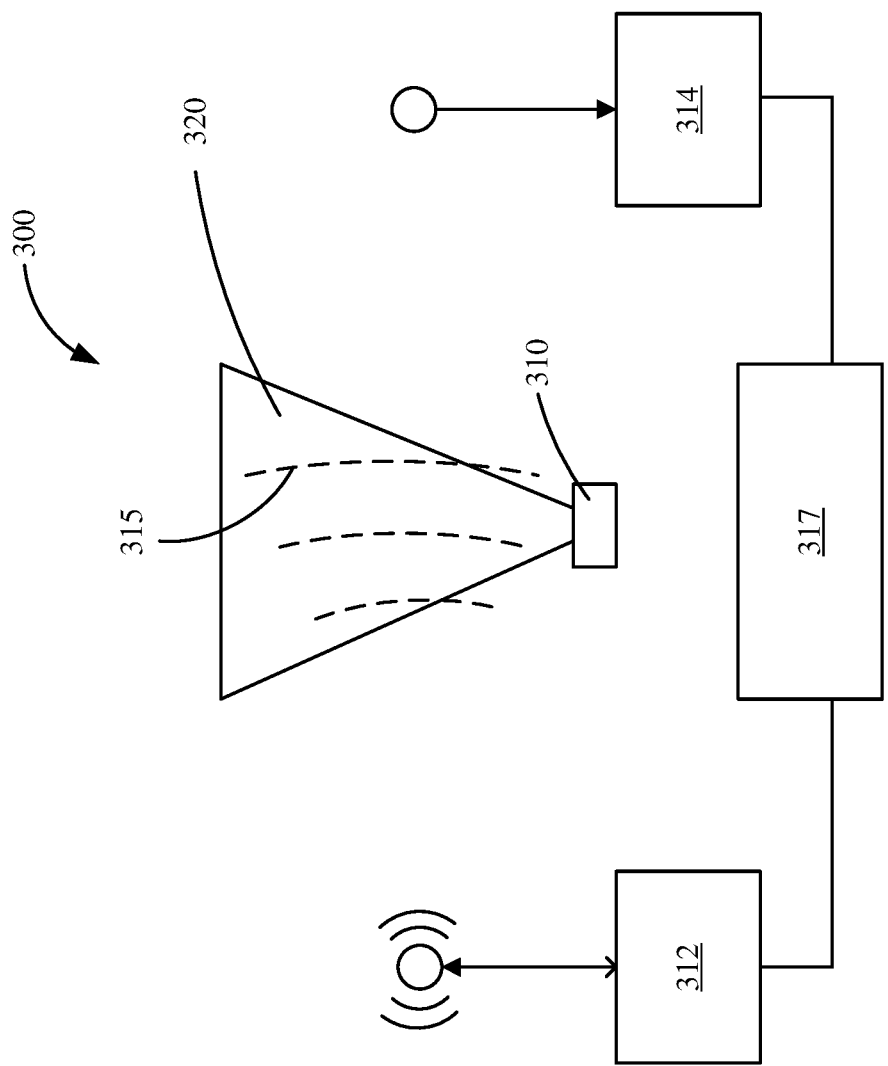
Figure 3B:
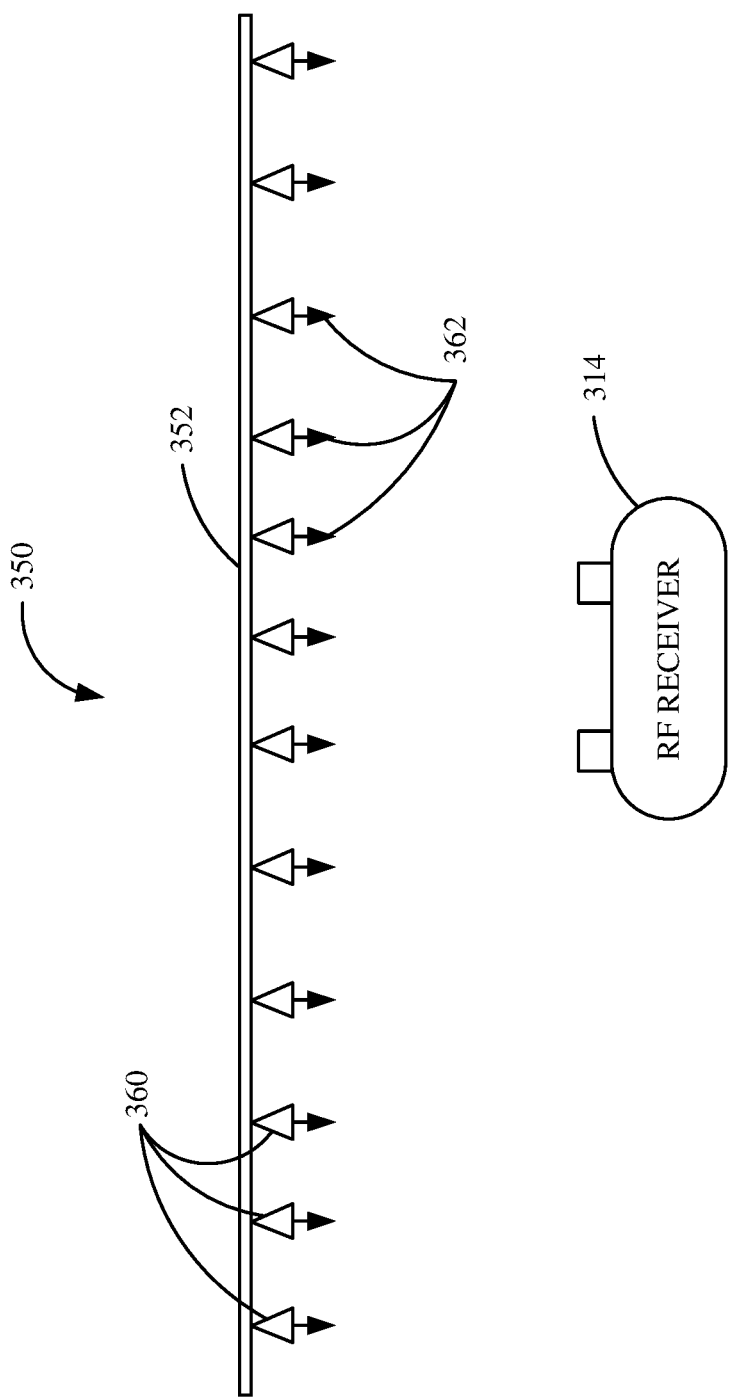

FIG. 3B illustrates a spray system 350 for a plurality of nozzles 360 mounted on boom 352. In the illustrated example, each nozzle 360 is paired with an RF signal transmitter (not shown) that emits a signal 362. In one example, each transmitter transmits a signal of the same amplitude but with a different frequency to that the RF receiver can differentiate the various signals. The RF transmitters can be positioned close to each of nozzles 360, such that each RF signal will pass through the dispersal pattern of its respective nozzle and be received by RF signal receiver 314. For example, the signal transmitters can be placed next to each nozzle 360, as well as above or below each nozzle 360 as long as the RF signal passes through the dispersal pattern of the respective nozzle. Thus, the signal transmitters can be mounted directly to boom 352, or to each of nozzles 360, or in other appropriate locations.

In one embodiment, RF receiver 314 is configured to substantially simultaneously receive RF signals relative to each of nozzles 360. However, it is also contemplated that RF receiver 314 may be configured to alternatively receive and analyze incoming RF signals relative to each nozzle 360 sequentially. The system, thus is able to provide a substantially real-time indication of the current efficacy of each nozzle during operation.

Figure 4A:
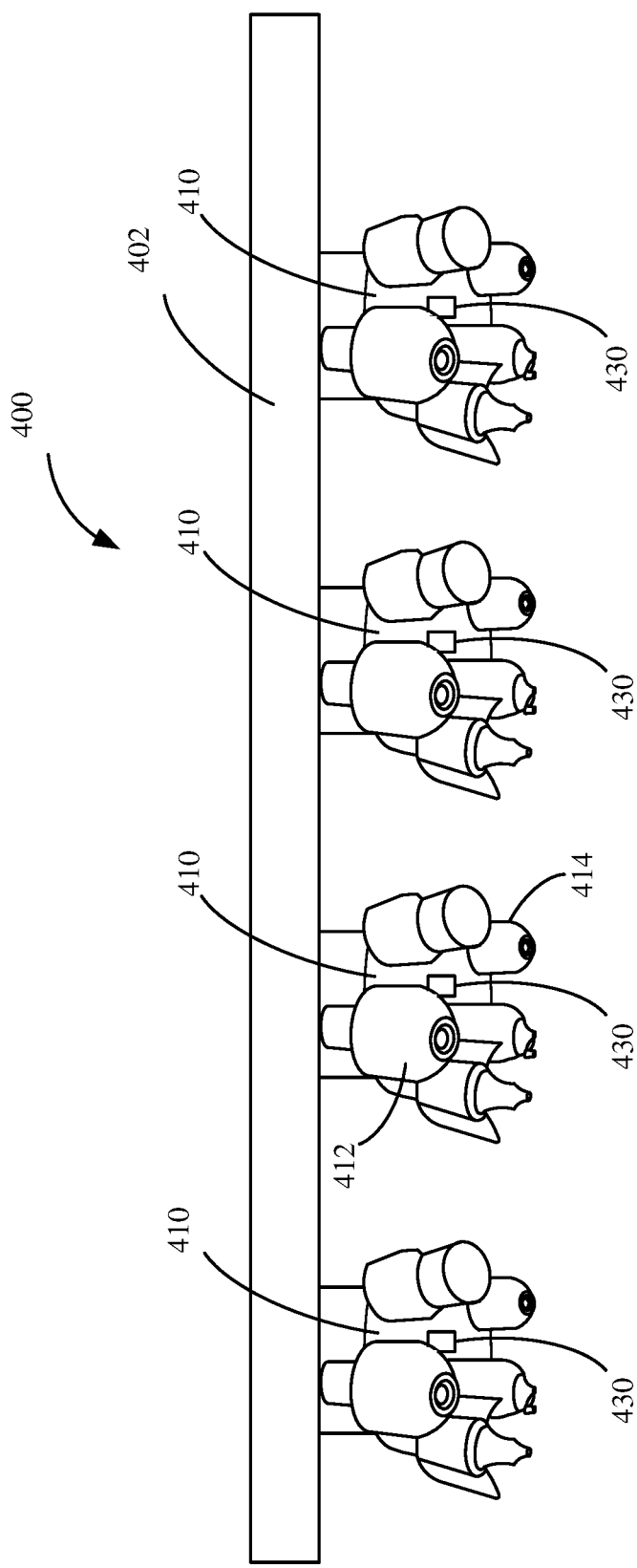

FIG. 4A illustrates a multi-nozzle spray system employing RF-based plugging detection in accordance with an embodiment of the present invention. System 400 includes a boom 402 coupled to a plurality of multi-nozzle bodies 410. In one example, multi-nozzle bodies 410 are used to deliver effective coverage over more area in less time. Using multiple nozzles allow an increase in productivity by better tolerating changes in spray speed. The group of nozzles can be used to deliver a single product at varying rates depending on how many individual nozzles are engaged. Additionally, the utilization of various nozzles can provide better placement precision of the product. In one example, multi-nozzle bodies 410 are those sold in relation to the trade designation ExactApply™ Nozzle Control, available from John Deere Corporation, of Moline, Ill.

As shown, each multi-nozzle body 410 is configured to mount a plurality of spray nozzles, such as first nozzle 412 and a second nozzle 414. First nozzle 412 and second nozzle 414 are diametrically opposite one another on multi-nozzle body 410. As illustrated in FIG. 4A, a multi-nozzle body 410 can be coupled to more than two nozzles; for example 4A shows five nozzles for each multi-nozzle body 410. Each multi-nozzle body 410 also includes, or is coupled to, an RF transmitter 430 that is configured to emit an RF signal. In one example, the RF signal is omnidirectional emanating outwardly from the center of multi-nozzle body 410. As can be appreciated, the RF signal will pass through the dispersal patterns of any individual nozzles that are engaged. The RF signal passing through the droplets of each dispersal pattern will be attenuated, or otherwise affected. An RF receiver positioned to detect the RF signal after passing through such a dispersal pattern is then used to detect whether a particular nozzle's pattern has changed.

Figure 4B:
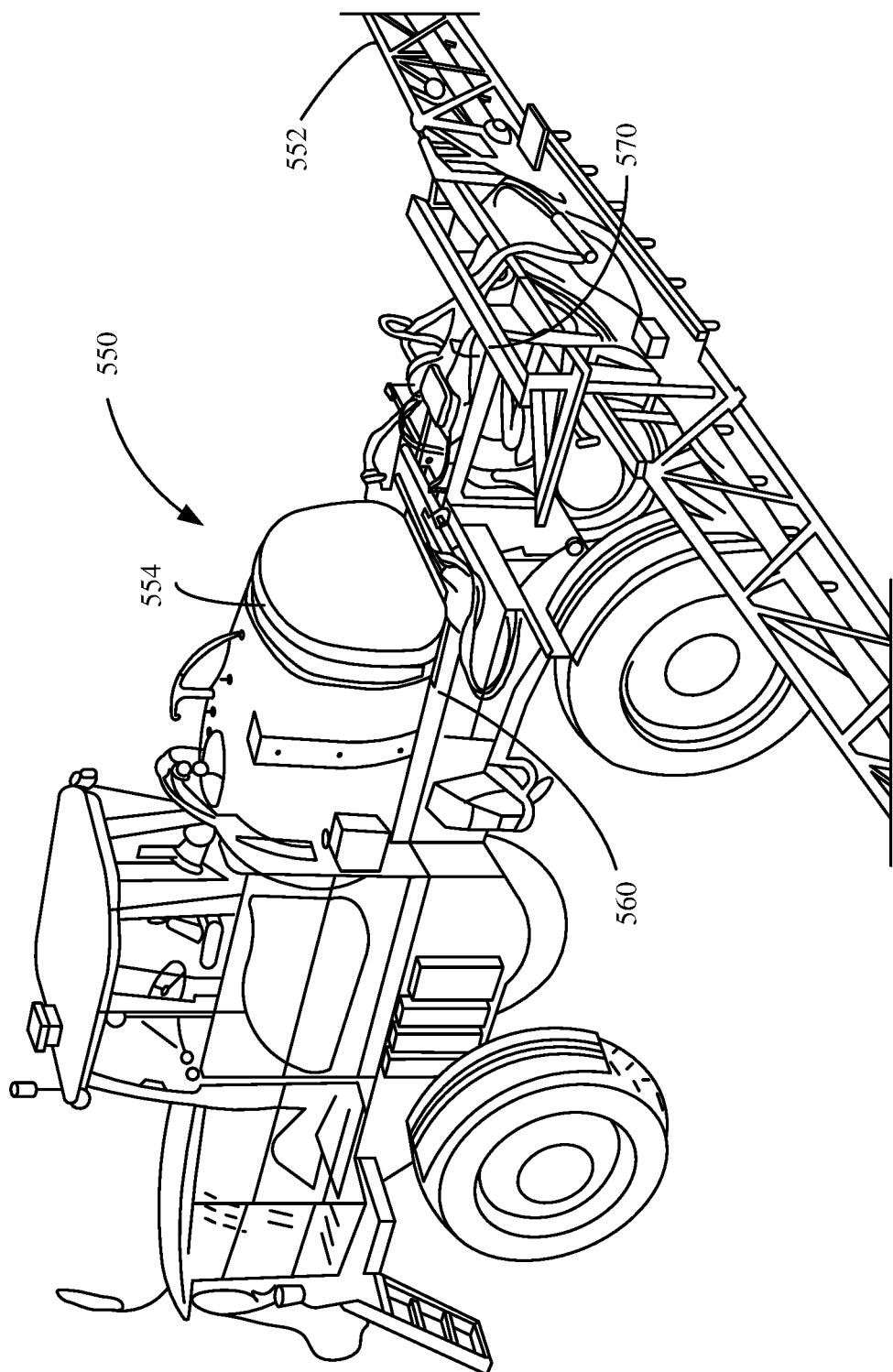

FIG. 4B illustrates an agricultural sprayer 550 with a pair of RF receivers 560, 570 to receive RF signals relative to multiple individual nozzles of a multi-nozzle body 410 in accordance with an embodiment of the present invention. As illustrated in FIG. 4B, first RF receiver 560 is mounted near solution tank 554, and second RF receiver 570 is located on the back side of a boom 552. Both first and second receivers 560, 570, receive the same signal from each multi-nozzle body RF transmitter 430. However, the signal received by first RF receiver 560 will be attenuated by the nozzle 412 (shown in FIG. 4A) while the signal received by second RF receiver 570 will be attenuated by nozzle 414 (shown in FIG. 4A). First and second receivers 560, 570 are coupled to a suitable controller, such as a controller of the agricultural machine, which analyzes the received signals to provide a plugging indication relative to the various nozzles, such as nozzles 412, and 414. This analysis may be as simple as merely comparing the two signals, such that any difference between the two signals can be used to indicate which nozzle of the pair of nozzles is plugged, either partially or fully.

Figure 5A:
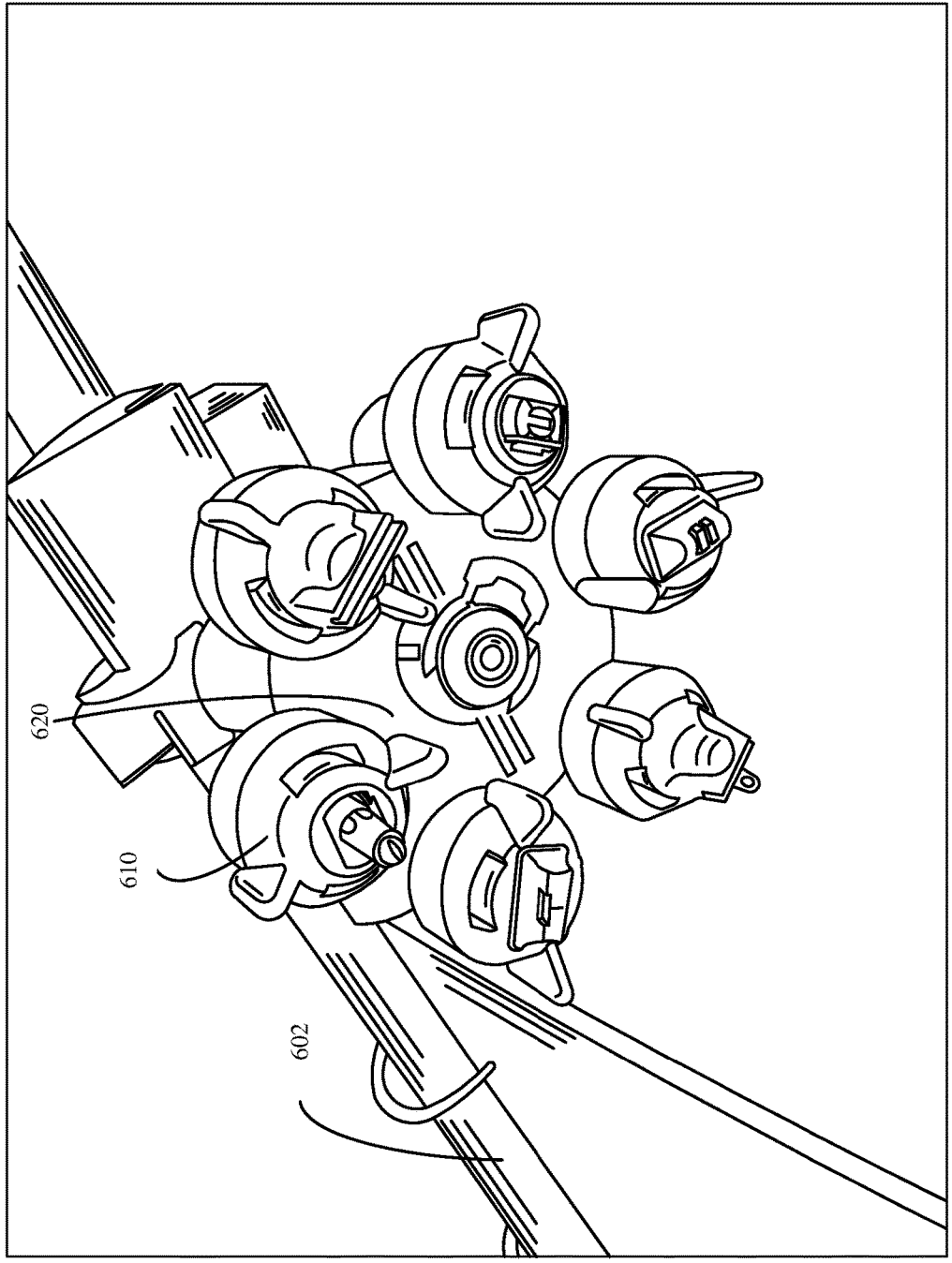
Figure 5B:
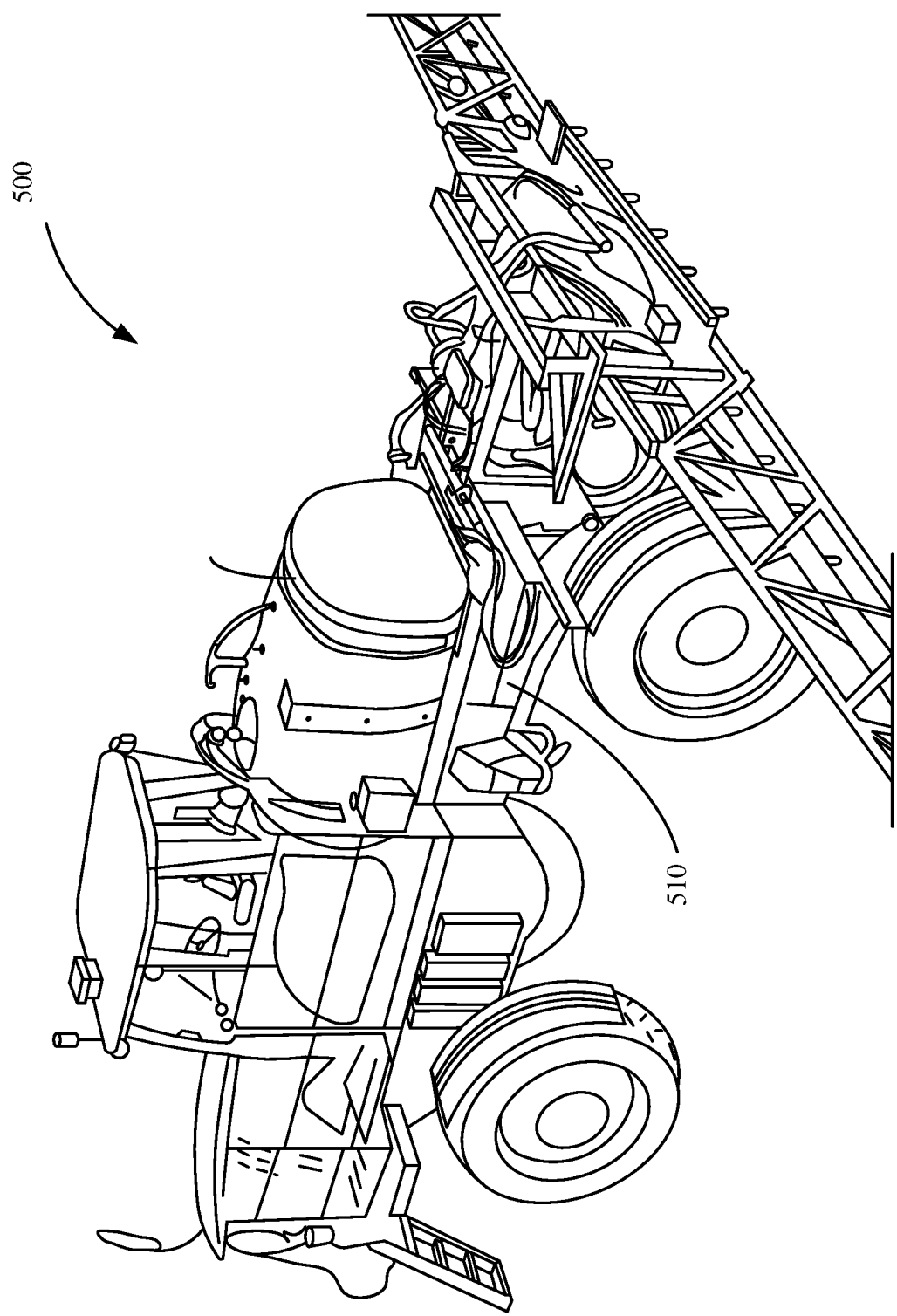

FIGS. 5A and 5B illustrate a multi-nozzle system employing RF-based plugging detection in accordance with another embodiment of the present invention. FIG. 5A is a bottom view of a multi-nozzle body having a plurality of individual RF transmitters, where each individual nozzle 610 of the multi-nozzle assembly has an associated RF transmitter 620. When only a subset set of nozzles 610 is active (for example, one pair of nozzles 610), only a subset of the associated transmitters 620 are also active. The RF signal transmitted by each RF transmitter 620 is attenuated by surrounding spray nozzles 610.

In embodiments where multiple RF transmitters 620 are used, any suitable technique for disambiguating the signals can be employed. For example, one RF transmitter 620 may operate in a first frequency range, while another RF transmitter 620 may operate in a second frequency range that does not overlap the first frequency range. Additionally, or alternatively, the different RF transmitters 620 may provide different modulation of their respective RF signals. Further still, the different RF transmitters 620 may be operated in sequence such that only a single RF transmitter 620 is operating at any given time.

FIG. 5B illustrates an agricultural sprayer 500 with RF receiver 510 mounted proximate a solution tank and configured to detect signals from the various RF transmitters 620 (shown in FIG. 5A). In one embodiment, a controller coupled to RF receiver 510 is configured to compare data from each nozzle with default data stored in the controller, or in another suitable location, that indicates normal nozzle operation. Based on the comparison to the default data, the controller can determine if a particular nozzle or pair of nozzles has partial or full plugging.

Figure 6:
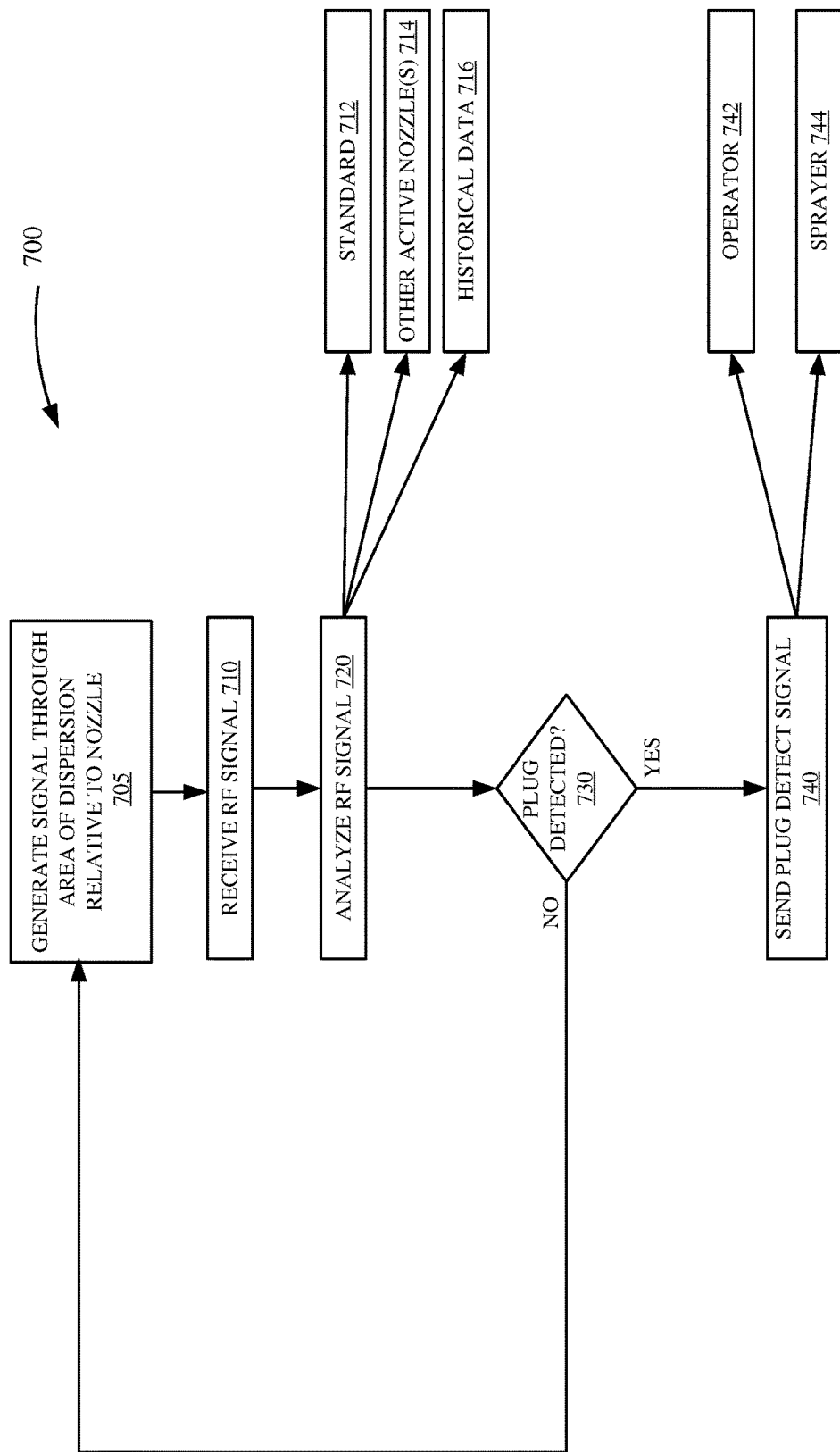

FIG. 6 illustrates a flow diagram of a method of detecting a plugged spray nozzle in accordance with an embodiment of the present invention. Method 700 can be used to detect a partial or fully plugged status of a nozzle on an agricultural sprayer. Method 700 can also be used with at least some of the single and multi-nozzle systems described herein.

Method 700 begins at block 705 where an RF signal is generated and passes through a dispersal area of at least one nozzle.

At block 710, the RF signal is received using an RF receiver, such as receiver 510. Next, at block 720, the received RF signal is analyzed. Analyzing the received RF signal, can include comparing the signal with a standard signal obtained and stored during known-good spraying conditions, as indicated in block 712. The standard can include a manufacturer-provided range of acceptable RF signals, or an indication of RF signals that indicate partial or complete plugging. Analyzing the received RF signal can additionally or alternatively include comparing the received signal with one or more received signals relative to other nozzles, as indicated in block 714. For example, using an average of a set of received RF signals can indicate that one or more nozzles in a set of nozzles is plugged, for example because the RF signal received from the plugged nozzle is different from the average in a statistically significant way. Historical data for a nozzle can also be used to detect full or partial plugging, as indicated in block 716. For example, a received RF signal will change as plugging is experienced, and the RF signal travels through a thinner, or non-existent spray.

At block 730, if a partial or fully plugged sensor is detected, method 700 proceeds to block 740 where an indication of plugging is provided. However, in the event that no plugging is detected for a particular nozzle, method 700 returns to block 705, and thus repeats.

At block 740, an indication of a plugged nozzle status is generated and sent. For example, an indication can be sent directly to an operator, as indicated in block 742, for example as an audible or visual alert. Additionally, or alternatively, a notification can be provided to an operator's device, such as a mobile phone. The indication can also be sent directly to the agricultural sprayer, as indicated in block 744, for remedial action, such as automatically switching to a different pair of active nozzles in a multi-nozzle assembly.

Figure 7:
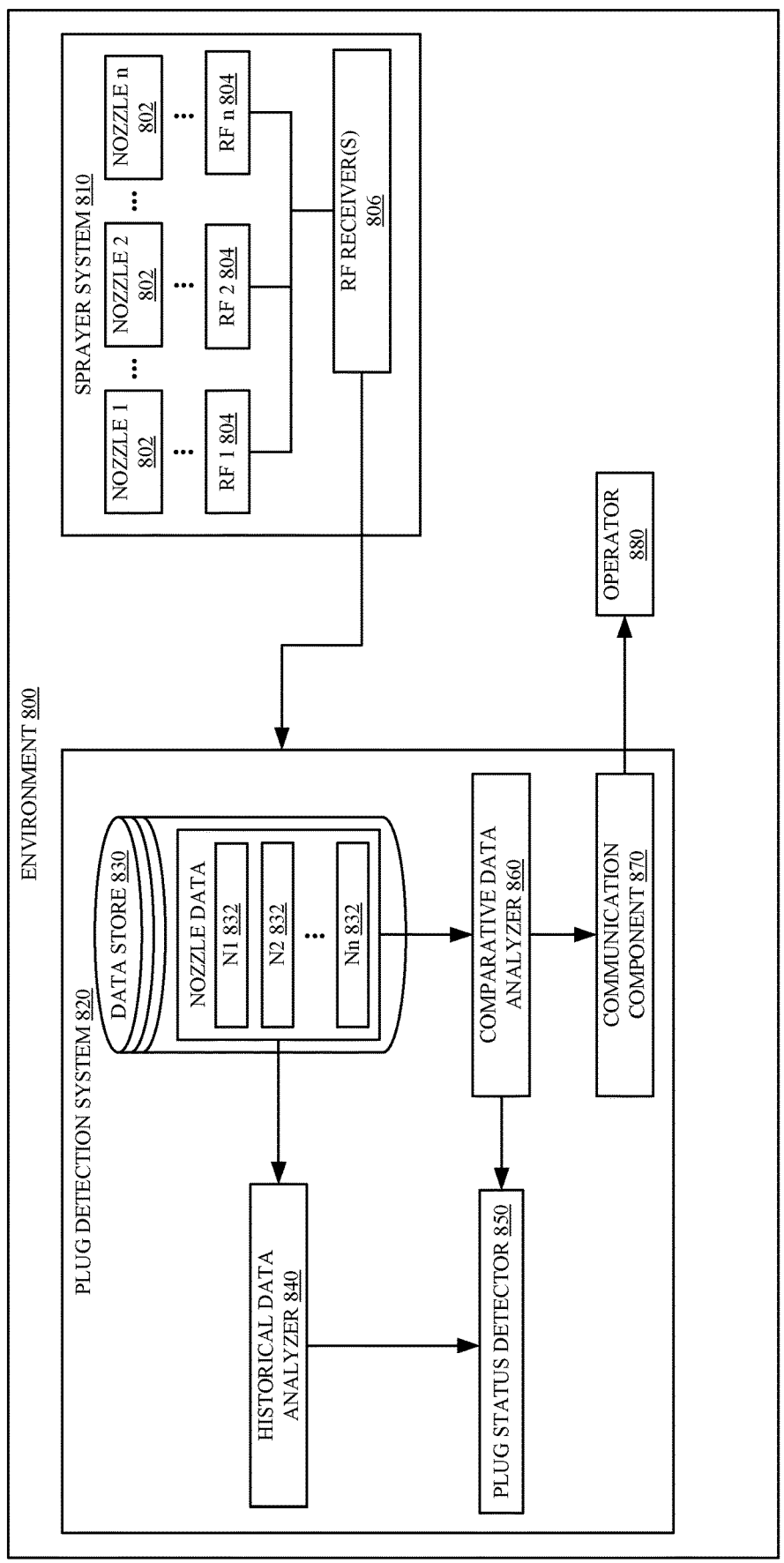

FIG. 7 illustrates an environment in which embodiments of the present invention are particularly useful. Sprayer system 810 is located within environment 800, and may be mounted to an agricultural vehicle, or towed by an agricultural vehicle, as illustrated in FIG. 1. Sprayer system 810 has one or more nozzles 802, either mounted directly to a boom, or to a nozzle body. Each nozzle 802 is associated with an RF transmitter 804. The signals generated by RF transmitter(s) 804 are configured to pass through respective dispersal areas of respective nozzles 802 and be attenuated or otherwise distorted by droplets of liquid in the dispersal area. The distorted RF signal is then detected by an RF receiver 806. Sprayer system 810 may include a single RF receiver 806 (such as described above with respect to FIGS. 5A and 5B) configured to receive signals alternatively from different RF transmitters 804 or sprayer system 810 may employ two or more RF receivers 806 (such as described above with respect to FIGS. 4A and 4B).

Environment 800 also includes an RF-based plug detection system 820, which may be located locally, for example as part of a computing unit within an agricultural vehicle, or remotely from an agricultural vehicle, for example within a separate computing system. RF-based plug detection system 820 includes storage component 830, which stores nozzle data 832, obtained from a plurality of nozzles 802, for example. Nozzle data 832 can be analyzed to detect a partial or completely plugged status within a nozzle 802. For example, historical data analyzer 840 can compare contemporaneously received nozzle data for a nozzle 802 to historical nozzle data 832 and detect a statistically significant difference. Additionally, comparative data analyzer 860 can compare nozzle data 832 from a single nozzle, to a known-good standard. For example, the known-good standard can include an average of contemporaneously received data 832 from all nozzles 802. Additionally, the known-good standard can include a standard provided from a manufacturer.

Based on a comparison, for example from historical data analyzer 840 or comparative data analyzer 860, plug status detector 850 detects that a nozzle 802 is experiencing partial or complete plugging, and generates a plugging indication. The plugging indication is then transmitted by communication component 870 to an operator 880, for example through a display on the agricultural vehicle, or through a display on a device associated with operator 880. Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is an agricultural sprayer, comprising:

- at least one nozzle configured to receive a fluid and direct atomized fluid to an agricultural surface in a dispersal area;
- a radio-frequency (RF) transmitter disposed to generate an RF signal that passes through the dispersal area, wherein the RF signal is detectably changed when interacting with droplets of the atomized fluid;
- a first RF receiver disposed to receive the RF signal after the RF signal passes through the dispersal area, the first RF receiver providing an output indicative of the RF signal; and
- a controller coupled to the first RF receiver and configured to detect plugging of the at least one nozzle based on the output of the first RF receiver.

Example 2 is the agricultural sprayer of any or all previous examples wherein the at least one nozzle comprises a plurality of nozzles.

Example 3 is the agricultural sprayer of any or all previous examples and further comprising a second RF receiver, wherein the first RF receiver is disposed to receive the RF signal after passing through the dispersal area of a first nozzle of the plurality of nozzles, and the second RF receiver is disposed to receive the RF signal after passing through the dispersal area of a second nozzle of the plurality of nozzles.

Example 4 is the agricultural sprayer of any or all previous examples wherein the controller is configured to detect plugging by comparing the output of the first RF receiver to an output of the second RF receiver.

Example 5 is the agricultural sprayer of any or all previous examples wherein the controller is configured to detect plugging by comparing the output of the first RF receiver to default data.

Example 6 is the agricultural sprayer of any or all previous examples wherein the plurality of nozzles are part of a multi-nozzle assembly.

Example 7 is the agricultural sprayer of any or all previous examples and further comprising a plurality of multi-nozzle assemblies.

Example 8 is the agricultural sprayer of any or all previous examples wherein the nozzles are spaced apart along a boom.

Example 9 is the agricultural sprayer of any or all previous examples wherein the controller is configured to provide an indication of plugging based on the detection.

Example 10 is the agricultural sprayer of any or all previous examples wherein the controller is configured to engage a different nozzle based on the detection.

Example 11 is the agricultural sprayer of any or all previous examples wherein the RF signal has a frequency in the range from about 7 GHz to about 55 GHz.

Example 12 is an agricultural sprayer, comprising:
a first multi-nozzle assembly having a multi-nozzle body and a plurality of nozzles coupled to the multi-nozzle body, each of the plurality of nozzles being separately actuatable and each having a respective dispersal area;
a first radio-frequency (RF) transmitter disposed to generate a first RF signal that passes through the dispersal area of a first nozzle of the plurality of nozzles, wherein the first RF signal is detectably changed when interacting with droplets of the atomized fluid in the dispersal area of the first nozzle of the plurality of nozzles;
a second RF transmitter disposed to generate a second RF signal that passes through the dispersal area of a second nozzle of the plurality of nozzles, wherein the second RF signal is detectably changed when interacting with droplets of the atomized fluid in the dispersal area of the second nozzle of the plurality of nozzles;
an RF receiver disposed to receive the first and second RF signals and provide an output indicative thereof; and
a controller coupled to the RF receiver and configured to detect plugging of the at least one nozzle based on the output of the RF receiver.

Example 13 is the agricultural sprayer of any or all previous examples wherein the controller is configured to detect plugging by comparing the output of the RF receiver when detecting the first RF signal to the output of the RF receiver when detecting the second RF signal.

Example 14 is the agricultural sprayer of any or all previous examples wherein the controller is configured to detect plugging by comparing the output of the RF receiver to default data.

Example 15 is the agricultural sprayer of any or all previous examples wherein the RF signal has a frequency in the range from about 7 GHz to about 55 GHz.

Example 16 is the agricultural sprayer of any or all previous examples wherein the controller is configured to provide an indication of plugging based on the detection.

Example 17 is the agricultural sprayer of any or all previous examples wherein the controller is configured to automatically disable a nozzle associated with plugging and activate a different nozzle of the plurality of nozzles.

Example 18 is the agricultural sprayer of any or all previous examples wherein the first and second nozzles are disposed diametrically opposite one another on the multi-nozzle body.

Example 19 is a method of detecting plugging in a nozzle of an agricultural sprayer, the method comprising:
generating a radio-frequency signal that passes through a dispersal area of the nozzle;
receiving the radio-frequency signal after the radio-frequency signal passes through the dispersal area of the nozzle and comparing attenuation of the received signal with a reference; and
generating an indication of plugging based on the comparison.

Example 20 is the method of any or all previous examples wherein the reference is a radio-frequency signal that passes through a dispersal area of a different nozzle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural sprayer, comprising:
a first nozzle and a second nozzle, each of the first nozzle and the second nozzle configured to receive a fluid and direct atomized fluid to an agricultural surface in a dispersal area;
a first radio-frequency (RF) transmitter disposed to generate a first RF signal that passes through the dispersal area of the first nozzle, wherein the first RF signal is detectably changed when interacting with droplets of the atomized fluid in the dispersal area of the first nozzle;
a second RF transmitter disposed to generate a second RF signal that passes through the dispersal area of the second nozzle, wherein the second RF signal is detectably changed when interacting with droplets of the atomized fluid in the dispersal area of the second nozzle;
an RF receiver configured to receive the first RF signal after the first RF signal passes through the dispersal area of the first nozzle and the second RF signal after the second RF signal passes through the dispersal area of the second nozzle, the RF receiver configured to provide an output based on one or more of the received first RF signal and the received second RF signal; and
a controller coupled to the RF receiver and configured to detect plugging of one or more of the first nozzle and the second nozzle based on the output of the RF receiver.

2. The agricultural sprayer of claim 1, wherein the RF receiver is configured to receive the first RF signal and the second RF signal substantially simultaneously.

3. The agricultural sprayer of claim 1, wherein the RF receiver is configured to receive the first RF signal and the second RF signal sequentially.

4. The agricultural sprayer of claim 1, wherein the output of the RF receiver is indicative of the received first RF signal and the received second RF signal and the controller is configured to detect plugging by comparing the first RF signal to the second RF signal.

5. The agricultural sprayer of claim 1, wherein the output of the RF receiver is indicative of one or more of the received first RF signal and the received second RF signal and the controller is configured to detect plugging by comparing the output of the RF receiver to data selected from the group consisting of default data, historical data, and information about all nozzles.

6. The agricultural sprayer of claim 1, wherein the first nozzle and the second nozzle are part of a plurality of nozzles, wherein each nozzle, of the plurality of nozzles, are configured to receive a fluid and direct atomized fluid to an agricultural surface in a dispersal area.

7. The agricultural sprayer of claim 6, wherein the first RF transmitter and the second RF transmitter are part of a plurality of RF transmitters, wherein each RF transmitter, of the plurality of RF transmitters, is configured to generate a respective RF signal that passes through a corresponding dispersal area of one of the plurality of nozzles, and wherein each respective RF signal is detectably changed when interacting with droplets of the atomized fluid in the corresponding dispersal area.

8. The agricultural sprayer of claim 7, wherein the controller is configured to engage a different nozzle based on the detection.

9. The agricultural sprayer of claim 7, wherein the RF receiver is configured to receive each respective RF signal.

10. The agricultural sprayer of claim 1, wherein the first nozzle and the second nozzle are spaced apart along a boom of the agricultural sprayer.

11. The agricultural sprayer of claim 1, wherein the controller is configured to provide an indication of plugging based on the detection, wherein the indication is selected from the group consisting of an audible indication, a visual indication, an LED indication, and a mobile indication.

12. The agricultural sprayer of claim 1, wherein RF receiver is disposed on the agricultural sprayer such that at least a portion of the dispersal area of the first nozzle is physically located between the first RF transmitter and the RF receiver and at least a portion of the dispersal area of the second nozzle is physically located between the second RF transmitter and the RF receiver.

13. An agricultural sprayer, comprising:
a plurality of nozzles, each nozzle, of the plurality of nozzles, configured to receive a fluid and direct atomized fluid to an agricultural surface in a dispersal area;
a first radio-frequency (RF) transmitter configured to generate a first RF signal that passes through the dispersal area of a first nozzle of the plurality of nozzles;
a second RF transmitter configured to generate a second RF signal that passes through the dispersal area of a second nozzle of the plurality of nozzles;
an RF receiver configured to receive the first RF signal after the first RF signal passes through the dispersal area of the first nozzle and the second RF signal after the second RF signal passes through the dispersal area of the second nozzle, the RF receiver configured to provide an output indicative of one or more of the first RF signal and the second RF signal; and
a controller coupled to the RF receiver and configured to detect a characteristic based on the output of the RF receiver.

14. The agricultural sprayer of claim 13, wherein the output of the RF receiver is indicative of an attenuation of the first RF signal and an attenuation of the second RF signal, and, wherein the controller is configured to detect plugging of one or more of the first nozzle and the second nozzle by comparing the attenuation of the first RF signal to the attenuation of the second RF signal.

15. The agricultural sprayer of claim 13, wherein the controller is configured to detect plugging of one or more of the first nozzle and the second nozzle by comparing the output of the RF receiver to default data.

16. The agricultural sprayer of claim 13, wherein each the first RF signal and the second RF signal, as generated, has a frequency in the range from 7 GHz to 55 GHz, and wherein the frequency of the first RF signal, as generated, is different than the frequency of the second RF signal, as generated, and wherein an amplitude of the first RF signal, as generated, is the same as an amplitude of the second RF signal, as generated.

17. The agricultural sprayer of claim 13, wherein the first RF transmitter and the second RF transmitter are part of a plurality of RF transmitters, wherein each RF transmitter, of the plurality of RF transmitters, are configured to generate a respective RF signal that passes through a corresponding dispersal area of one of the plurality of nozzles.

18. The agricultural sprayer of claim 17, wherein the RF receiver is disposed on the agricultural sprayer such that at least a portion of each dispersal area of each nozzle, of the plurality of nozzles, is physically located between the corresponding RF transmitter, of the plurality of RF transmitters, and the RF receiver.

19. The agricultural sprayer of claim 13, wherein the controller is configured to detect plugging of one or more of the first nozzle and the second nozzle based on the output of the RF receiver and automatically disable one or more of the first nozzle and the second nozzle and activate a different nozzle, of the plurality of nozzles, based on the detection of plugging.

20. A method of detecting plugging in a nozzle of an agricultural sprayer, the method comprising:
generating, with a first radio-frequency (RF) transmitter, a first RF signal that passes through a dispersal area of a first nozzle;
generating, with a second RF transmitter, a second RF signal that passes through a dispersal area of a second nozzle;
receiving with an RF receiver the first RF signal after the first RF signal passes through the dispersal area of the first nozzle and the second RF signal after the second RF signal passes through the dispersal area of the second nozzle;
comparing an attenuation of the first RF signal as received by the RF receiver to an attenuation of the second RP signal as received by the RF receiver;
generating an indication of plugging of at least one of the first nozzle or the second nozzle based on the comparison; and
generating a control signal to control at least one of the first nozzle or the second nozzle based on the indication of plugging.

* * * * *